United States Patent [19]
Nakadate et al.

[11] Patent Number: 5,344,102
[45] Date of Patent: Sep. 6, 1994

[54] ROTARY-WING BLADE OF ROTARY-WING AIRCRAFT

[75] Inventors: Masaaki Nakadate; Masahiro Obukata, both of Utsunomiya, Japan

[73] Assignee: Fuji Jukogyo Kabushiki Kaisha, Tokyo, Japan

[21] Appl. No.: 889,800

[22] Filed: May 29, 1992

[30] Foreign Application Priority Data

Jun. 3, 1991 [JP] Japan .................. 3-131428

[51] Int. Cl.⁵ .............................. B64C 3/00
[52] U.S. Cl. ................ 244/35 R; 244/34 R; 416/223 R
[58] Field of Search ............ 244/34 R, 35 R, 123; 416/223 R, 227 A

[56] References Cited

U.S. PATENT DOCUMENTS

| | | | |
|---|---|---|---|
| 4,416,434 | 11/1983 | Thibert et al. | 244/35 R |
| 4,652,213 | 3/1987 | Thibert et al. | 416/223 R |
| 4,776,531 | 10/1988 | Noonan | 244/35 R |

FOREIGN PATENT DOCUMENTS 56-95799 8/1981 Japan .
61-33760 8/1986 Japan .
1-56960 12/1989 Japan .

OTHER PUBLICATIONS

Barnes W. McCormick "Aerodynamics Aeronautics and Flight Mechanics" ©1979 pp. 63-93.

*Primary Examiner*—Margaret A. Focarino
*Assistant Examiner*—Christopher P. Ellis
*Attorney, Agent, or Firm*—Beveridge, DeGrandi, Weilacher & Young

[57] ABSTRACT

A rotary-wing blade of a rotary-wing aircraft has an airfoil section which has an asymmetrical region of positive camber from its leading edge to its approximately 30-percent chord length point and an essentially symmetrical airfoil region from its 30-percent chord point to approximately its 90-percent chord length point. The region aft of the 90-percent chord point can be optionally curved or reflexed upward or downward to a limited degree. This blade has a large lift coefficient and a small pitching moment and is readily adaptable to meet various design conditions of lift coefficient and pitching moment.

9 Claims, 9 Drawing Sheets

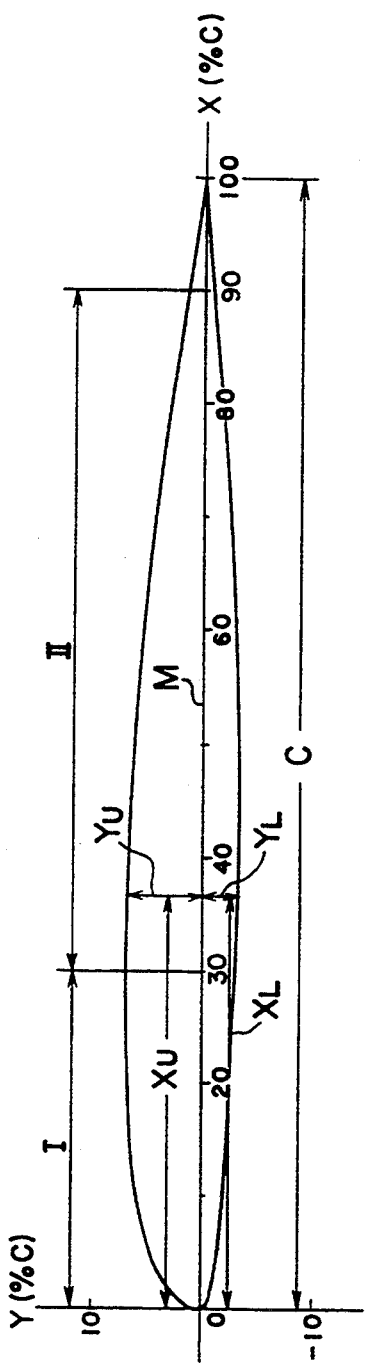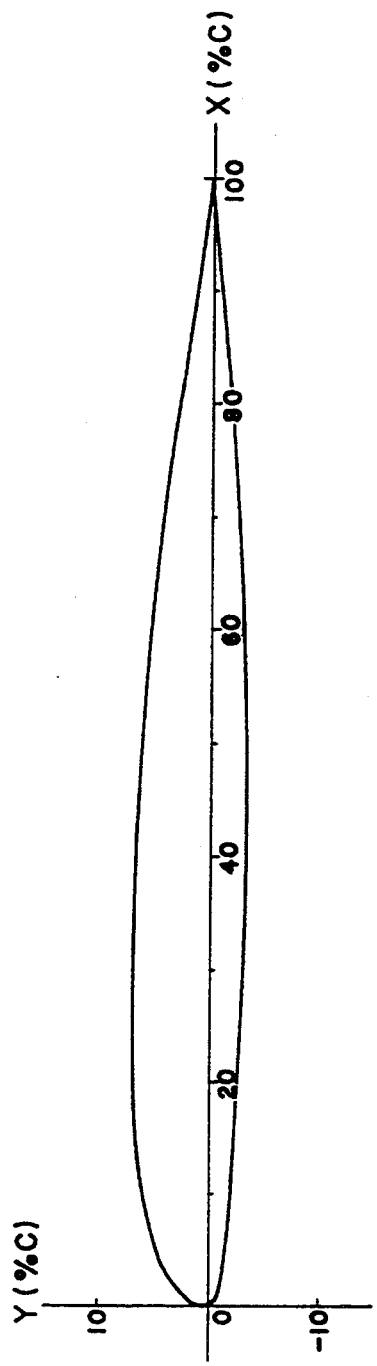

ROTARY-WING BLADE OF ROTARY-WING AIRCRAFT

BACKGROUND OF THE INVENTION

The present invention relates generally to a rotary-wing blade of a rotary-wing aircraft, and more particularly, to a cross-sectional shape of a rotary-wing blade. The cross-sectional shape will hereinafter be referred to as a wing section or airfoil section.

In general, various wing sections have been and are being developed for obtaining desired lift and drag forces of fixed wings and rotary wings. Wing sections can be classified by any of the characteristics thereof. A classification by camber of the wing section is illustrated in FIGS. 9(a) through (e). FIG. 9(a) shows a symmetrical airfoil; FIG. 9(b) a positive camber airfoil; FIG. 9(c) a negative camber airfoil; FIG. 9(d) a leading edge camber (leading-edge droop) airfoil; and FIG. 9(e) a trailing-edge camber (rear-loading) airfoil.

Most of the rotary-wing blades of the rotary-wing aircraft of the prior art have airfoil shapes developed by the National Advisory Committee for Aeronautics (NACA), which is predecessor of the National Aeronautics and Space Administration (NASA). Representative examples of airfoils of the NACA are symmetrical airfoil NACA 0012 and cambered airfoil NACA 23012. However, these airfoils have the following inadequacies. Both the subsonic maximum lift coefficient $Cl_{max}$ and zero-lift drag-divergence Mach number Mdd, required for improving the high-velocity performance of rotary-wing aircraft, of NACA 0012 are low. The NACA 23012 has a relatively high maximum lift coefficient $Cl_{max}$. However, its zero-lift drag-divergence Mach number Mdd is low. Therefore the airfoils cannot be expected to contribute to a significant improvement of performance of rotary-wing aircraft.

In comparison, the airfoils proposed in Japanese Patent Publication No. 61-33760 and Japanese Patent Publication No. 1-56960 (corresponding to U.S. Pat. No. 4,416,434) are directed toward performances that are higher. The airfoils have higher maximum lift coefficients $Cl_{max}$ and zero-lift, drag-convergence Mach numbers Mdd.

FIG. 10 is a graph indicating comparison of the performances of airfoils. The ordinate of the graph represents maximum lift coefficient $Cl_{max}$ at Mach 0.4. The abscissa represents zero-lift drag-divergence Mach number Mdd. The graph shows points respectively representing the performances of the above mentioned airfoil NACA 0012, airfoil NACA 23012, the airfoil (designated by reference character T) disclosed in Japanese Patent Publication No. 1-56960, and airfoils (SC 1095-R8 and SC 1095) disclosed in Japanese Patent Publication No. 61-33760.

The graph of FIG. 10 indicates that airfoils T, SC 1095-R8, and SC 1095 have higher maximum lift coefficients $Cl_{max}$ at Mach 0.4 and higher zero-lift, drag-divergence Mach number Mdd than airfoil NACA 0012. The graph indicates also that airfoils SC 1095-R8 and SC 1095 have higher zero-lift drag-divergence Mach numbers Mdd than NACA 23012.

The cross-sectional airfoil section disclosed in Japanese Patent Publication No. 1-56960 is shown in FIG. 11. As shown, the airfoil section is a positive camber section with an up-curved or reflexed trailing edge. The upwardly curved trailing edge is intended to reduce the nose-down (negative) pitching moment. The negative pitching moment is a cause of vibration unavoidable in a positive-camber airfoil and of an increase of the load on the pitch angle varying mechanism.

The cross-sectional airfoil sections SC 1095-R8 and SC 1095, disclosed in Japanese Patent Publication No. 61-33760 are shown respectively in FIGS. 12(a) and 12(b). In the case of these airfoils, the nose-down (negative) pitching moment is reduced by adding trailing-edge tabs to provide an up-turned trailing edge.

The performances of rotary-wing aircraft have been improving steadily in recent years. In accordance with this trend, various high-performance airfoils have been proposed. For example, Japanese Patent Application Laid-Open Publication No. 56-95799 discloses a series of four airfoils designated as VR-12, VR-13, VR-14, and VR-15. The relationship between the maximum lift coefficient $Cl_{max}$ at Mach 0.4 and the zero-lift drag-divergence Mach number Mdd of each of these airfoils is indicated also in FIG. 10. As indicated in FIG. 10, the airfoils have high values of both $Cl_{max}$ and Mdd. From this, it can be said that the airfoils have high performance.

The cross-sectional profiles of the airfoils of the series disclosed in Japanese Patent Application Laid-Open Publication No. 56-95799 are shown respectively in FIGS. 13(a), 13(b), 13(c), and 13(d). Similarly as in the case of the other airfoils described hereinabove, upward curves are added thereto in the vicinity of their trailing edges. Thus, the nose-down (negative) pitching moment due to positive camber is reduced in each case.

In general, the pitching moment of a symmetrical airfoil is essentially zero. Furthermore, a symmetrical airfoil is advantageous with regard to its zero-lift drag-divergence Mach number. However, a symmetrical airfoil has the disadvantage of low maximum lift.

In this connection, most of the positive-camber airfoils of the prior art have added positive camber over substantially the entire region thereof from the leading edge to the trailing edge. This feature is intended to increase their maximum lift coefficient. However, in order to mitigate the excessively great nose-down (negative) pitching moment to which these positive-camber airfoils are subjected, they are provided with up-curved or reflexed curves at their trailing edges.

Increasing the angle of up-turn of the airfoil trailing edge may appear to be a measure for further decreasing the nose-down pitching moment. However, increasing the up-turn angle of the trailing edge results in performance-deteriorating effects such as flow separation at the lower surface of the up-turned part of the blade. For this reason, in the case where the allowable value of the pitching moment is small, a major change in the design of the wing section shape becomes necessary. An example of one item of such change is a reduction in the camber.

SUMMARY OF THE INVENTION

Accordingly, an object of the present invention is to provide a rotary wing blade of a rotary-wing aircraft which blade has a large lift coefficient and, moreover, a small pitching moment and, further, is capable of readily meeting various design conditions of lift coefficient and pitching moment.

In order to achieve the above stated object, the present invention provides a rotary-wing blade of a rotary-wing aircraft, which blade has a cross-sectional shape or airfoil section characterized in that it comprises an asymmetrical region of positive camber extending aft from its leading edge to a point approximately 30 percent of the chord dimension or length therefrom and a region essentially of symmetry of upper and lower airfoil surfaces extending from the 30-percent chord length point to approximately the 90-percent chord length point.

Because of the above described characteristic airfoil section of the rotary-wing blade of the present invention, the above mentioned asymmetrical region moderates the negative pressure peak at the upper surface of the leading edge and effectively generates lift. On the other hand, the region of essentially symmetrical upper and lower airfoil surfaces produces less lift than a positive camber airfoil section. For this reason, the nose-down (negative) pitching moment arising from the lift of this region is also small. As a result, by the practice of the present invention, a rotary-wing blade of an airfoil section of small pitching moment can be obtained while the maximum lift coefficient and the drag-divergence Mach number are held at high values.

Preferred embodiments of the present invention will become understood from the following detailed description referring to the accompanying drawings.

BRIEF DESCRIPTION OF THE DRAWINGS

FIG. 1 is a graphical diagram showing an airfoil according to a first embodiment of the present invention;

FIG. 2 is a graphical diagram showing an airfoil according to a second embodiment of the present invention;

DESCRIPTION OF THE PREFERRED EMBODIMENTS

The essence of the present invention resides in cross-sectional profiles or shapes of a rotary-wing blade of a rotary-wing aircraft. However, prior to a description of the cross-sectional shapes of rotary-wing blades, a general description of the performance required for the airfoil section of a rotary-wing blade of a rotary-wing aircraft will first be presented.

Figure 7:
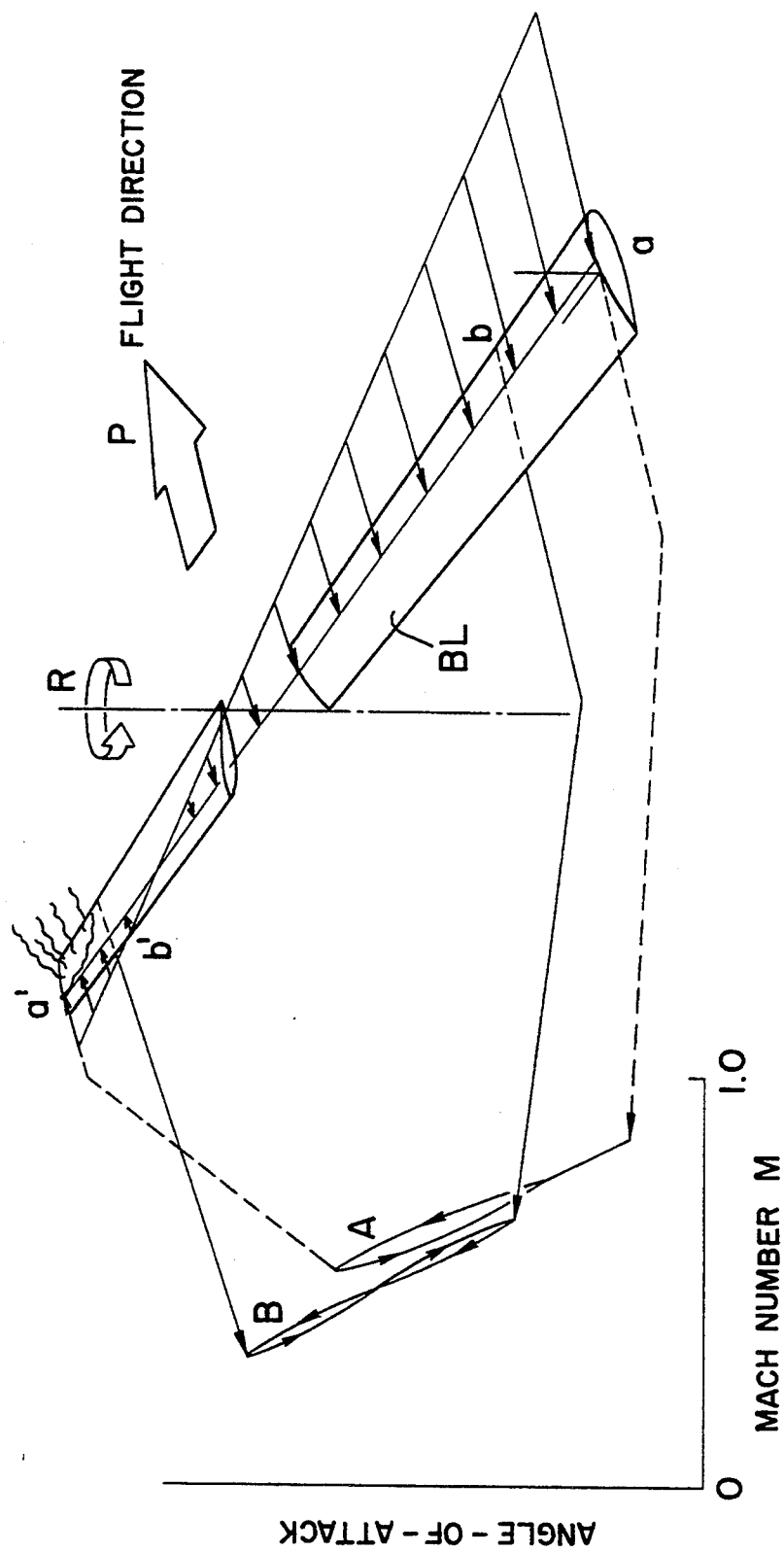
FIG. 7 is a combination of a perspective view and a graph indicating the relationship between angle-of-attack relative to the airflow of a rotary-wing blade of a rotary-wing aircraft and Mach number.

FIG. 7 indicates the relationship between the angle-of-attack and the Mach number of the air flow which actually acts on a blade-tip portion and a central portion of a rotary-wing blade BL of a rotary-wing aircraft in flight. In FIG. 7, the arrow symbol P indicates the direction of advance or flight of the rotary-wing aircraft. The arrow symbol R indicates the rotational direction of the rotary-wing blade. The curve A indicates the variation with time of the relationship between the angle-of-attack of a blade tip portion a or a' of the rotary-wing blade BL relative to the atmosphere (space) and the Mach number. The curve B indicates the variation with time of the relationship between the angle-of-attack of a central portion b or b' of the rotary-wing blade BL relative to the atmosphere and the Mach number.

Under the flight condition illustrated, the rotary-wing blade BL is rotating in the direction R, and the plane of rotation of the rotary wing BL is inclined relative to flight direction P of the rotary-wing aircraft. Under the above flight condition, when the blade BL is moving in the direction of flight P of the aircraft, its velocity relative to the air is high, and its angle-of-attack is small. Conversely, when the blade BL is moving in the direction opposite to the flight direction P, its velocity relative to the air is low, and its angle-of-attack is large. That is, the same airfoil section must function under air flow conditions varying as indicated by curves A and B. More specifically, when the velocity relative to the air is high, and the angle-of-attack is small, the blade BL is required to have a high drag divergence Mach number. Conversely, when the velocity relative to the air is low, and the angle-of-attack is large, the blade BL is required to have a large lift coefficient. Furthermore, as indicated in FIG. 7, the blade tip portion a or a' is at a smaller angle-of-attack and is moving at a higher velocity, relative to the air than the blade central part b or b'. It is desirable that the rotary-wing blade of a rotary-wing aircraft have a large lift and a high drag-divergence Mach number with respect to the various air flow conditions described above.

Figure 8:
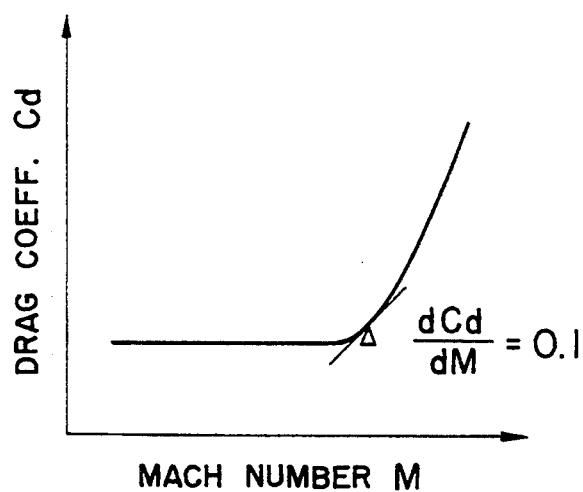
FIG. 8 is a graph for a definition of drag-divergence Mach number Mdd.
Figure 9A:
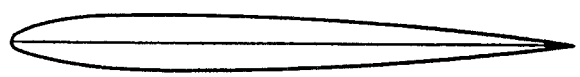
FIGS. 9(a) through 9(e) show airfoils classified respectively by the shapes of their cambers.
Figure 9B:
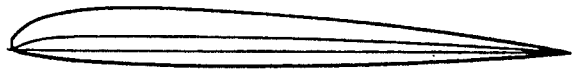
Figure 9C:
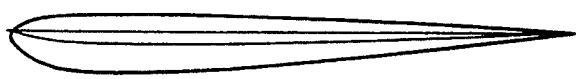
Figure 9D:
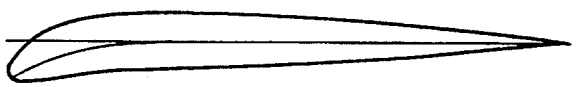
Figure 9E:
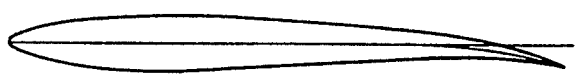
Figure 10:
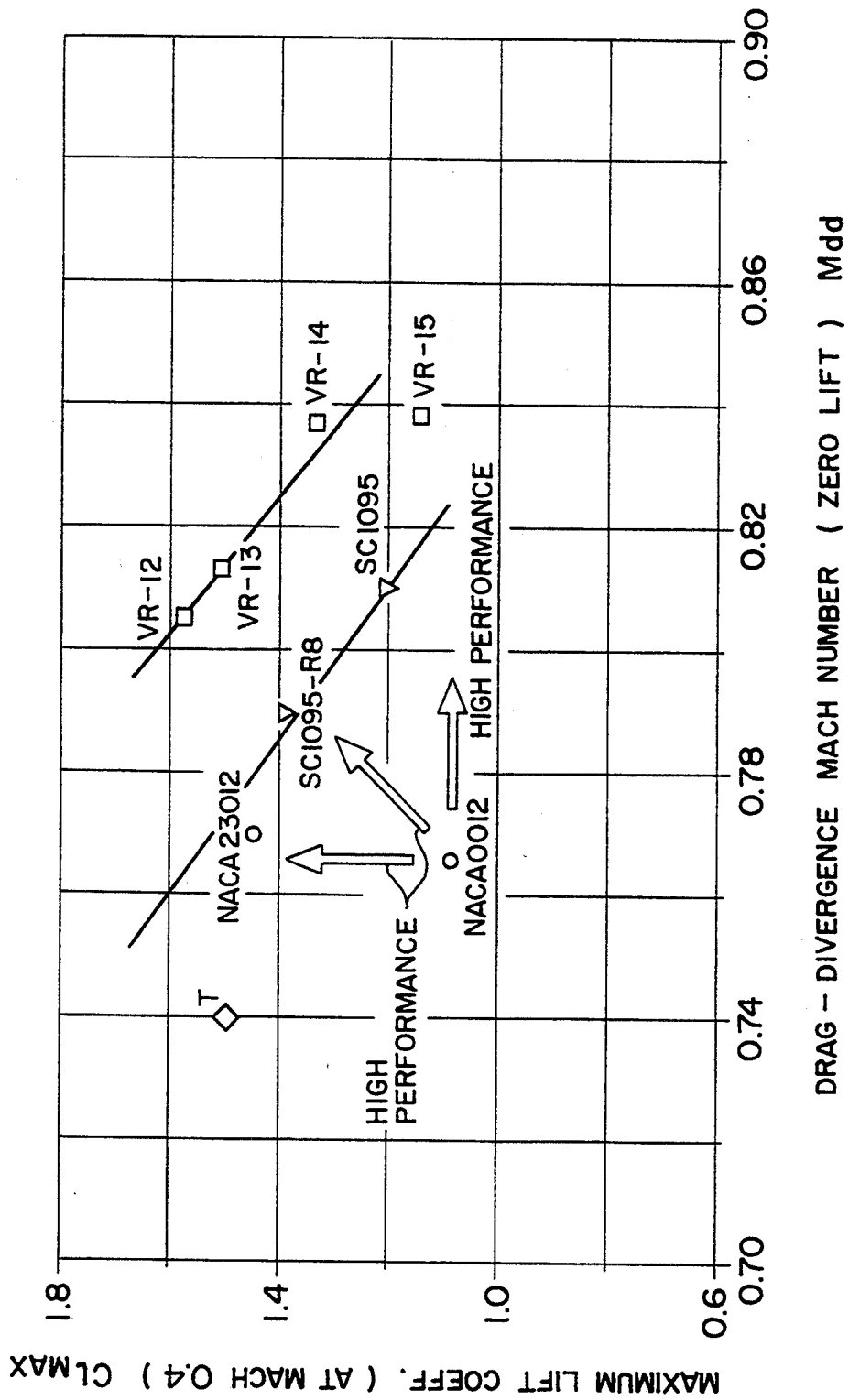
FIG. 10 is a graph similar to FIG. 6 indicating the performances of known airfoils.
Figure 11:
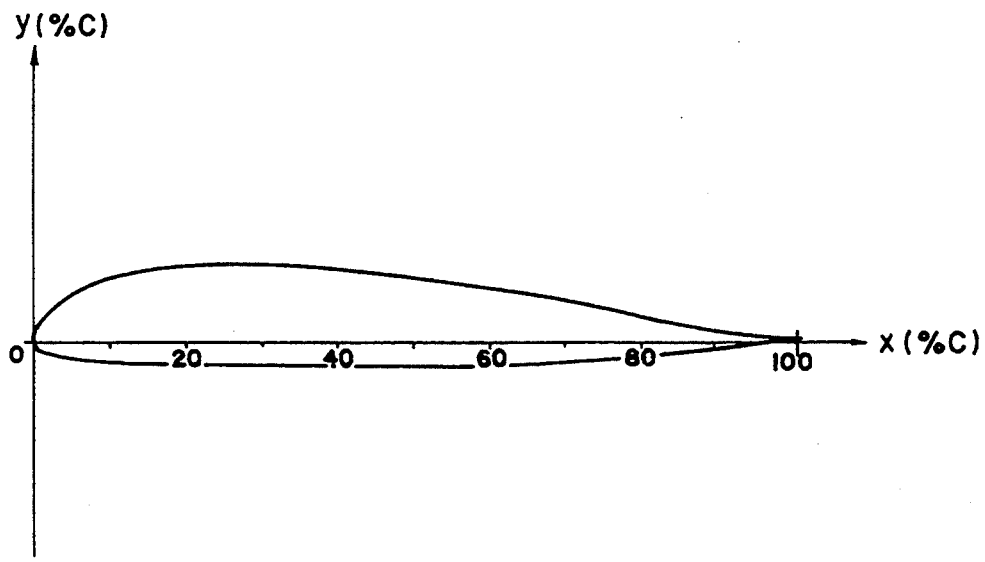
FIG. 11 is a graphical diagram showing a known airfoil.
Figure 12A:
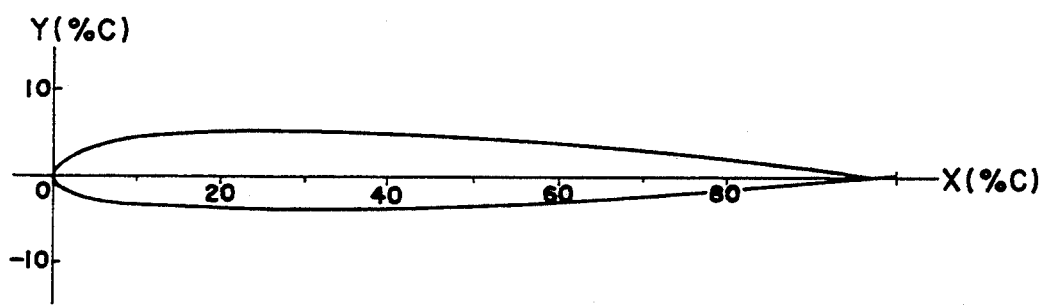
FIGS. 12(a) and 12(b) are graphical diagrams showing other known airfoils.
Figure 12B:
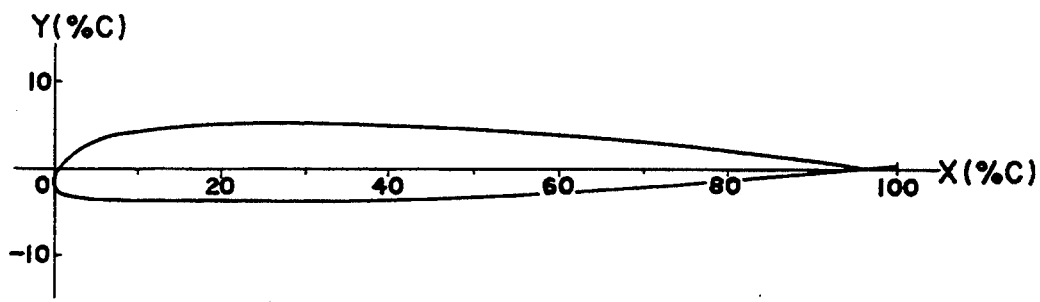
Figure 13A:
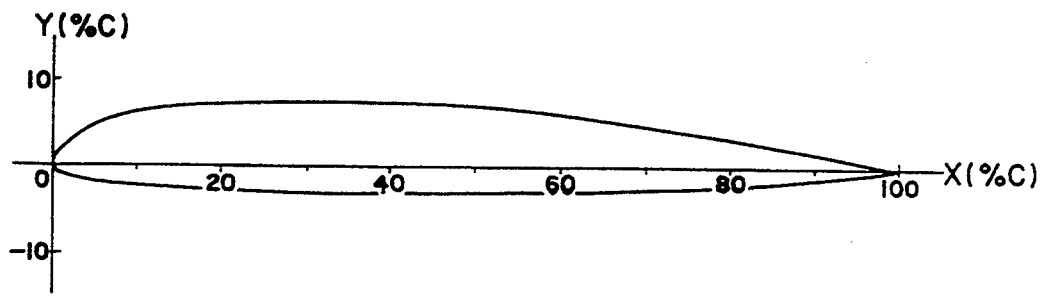
FIGS. 13(a) through 13(d) are graphical diagrams showing further known airfoils.
Figure 13B:
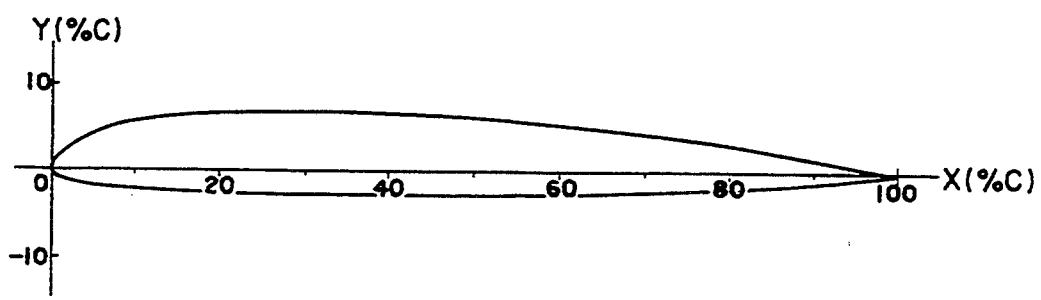
Figure 13C:
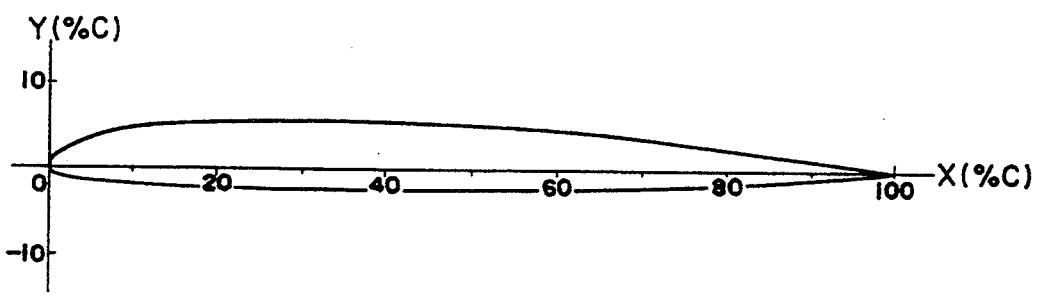
Figure 13D:
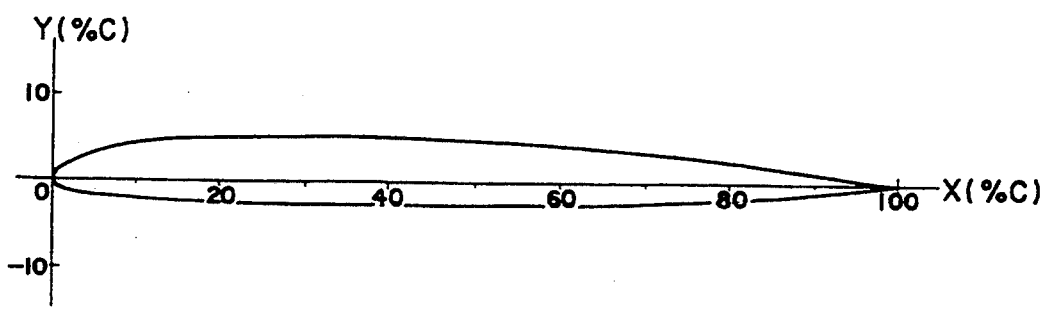

The Mach number referred to above as drag-divergence Mach number is herein defined as follows. As indicated in FIG. 8, as the velocity of the air flow relative to the blade increases and exceeds a specific Mach number, the drag coefficient of the blade suddenly increases at that instant. This specific Mach number is the drag-divergence Mach number. More precisely, it is that Mach number at the point where, as indicated in FIG. 8, the slope (dCd/dM) of the curve representing the relation between the drag coefficient Cd and the Mach number M becomes 0.1.

An airfoil section which will be referred to as airfoil section U896H-10 constitutes a first embodiment of the present invention. The cross-sectional shape of the airfoil section U896H-10 is shown in FIG. 1. As shown, the airfoil section U896H-10 comprises, essentially, a forward region I and an aft region II. The forward region I extends aft from the leading edge to the 30-percent chord length point. The airfoil section shape of the region I is an asymmetrical region having a positive camber. The aft region II extends aft from the 30-percent chord length point to the 90-percent chord length point. In the aft region II and thereaft, the mean line is substantially straight. That is, the airfoil in this region is essentially a symmetrical section.

The airfoil cross-section shape of the airfoil section U896H-10 from its leading edge point to its 100-percent chord length point is definitively specified by coordinate quantities in Table 1 set forth below. This is a conventional mode of defining airfoil cross-sectional shapes. It is utilized in Appendix III, Airfoil Ordinates, in Abbott, Ira H., Von Doenhoff, Albert E.: THEORY OF WING SECTIONS, Dover Publications, Inc., New York, 1959, Standard Book Number: 486-60586-8. In Table 1, coordinates as shown in FIG. 1 are specified. All linear dimensions (distances) are expressed as percentages of the chord length C. As designated in FIG. 1, $X_U$ and $X_L$ are distances aft from the leading edge of the airfoil. $Y_U$ and $Y_L$ are ordinates indicating distances of the upper surface and lower surface, respectively, of the airfoil from the chord line M as measured perpendicularly to the chord line M. Subscripts U and L respectively indicate "upper" and "lower". In the airfoil section U896H-10, the basic airfoil thickness is 10 percent of the chord length C.

TABLE 1

| Upper surface | | Lower surface | |
|---|---|---|---|
| $X_U/C$ (%) | $Y_U/C$ (%) | $X_L/C$ (%) | $Y_L/C$ (%) |
| 0.000 | 0.000 | 0.000 | 0.000 |
| 0.150 | 0.980 | 0.150 | −0.375 |
| 0.500 | 1.672 | 0.500 | −0.642 |
| 1.250 | 2.573 | 1.250 | −0.929 |
| 2.500 | 3.506 | 2.500 | −1.220 |
| 5.000 | 4.720 | 5.000 | −1.590 |
| 7.500 | 5.485 | 7.500 | −1.850 |
| 10.000 | 6.005 | 10.000 | −2.040 |
| 15.000 | 6.565 | 15.000 | −2.310 |
| 20.000 | 6.772 | 20.000 | −2.560 |
| 30.000 | 6.839 | 30.000 | −3.063 |
| 40.000 | 6.604 | 40.000 | −3.361 |
| 50.000 | 6.103 | 50.000 | −3.393 |
| 60.000 | 5.299 | 60.000 | −3.123 |
| 70.000 | 4.194 | 70.000 | −2.556 |
| 80.000 | 2.843 | 80.000 | −1.749 |
| 90.000 | 1.422 | 90.000 | −0.875 |
| 100.000 | 0.000 | 100.000 | 0.000 |

FIG. 2 shows the cross-sectional shape of an airfoil section designated as airfoil section U896H-10UR. This airfoil section constitutes a second embodiment of the present invention. The airfoil section U896H-10UR, in its portion from its wing leading edge to its 95-percent chord dimension point, has the same shape as the above described airfoil section U896H-10. However, the wing trailing edge of the section U896H-10UR is up-turned by 0.321 percent (relative to the airfoil chord dimension C). By the provision of the up-turned trailing edge, the pitching moment at 0.6 Mach and zero lift of the airfoil section U896H-10UR is essentially zero.

The airfoil cross-sectional shape of the airfoil section U896H-10UR, with a basic airfoil thickness of 10 percent of the chord length, is definitively specified by the quantities in the following Table 2.

TABLE 2

| Upper surface | | Lower surface | |
|---|---|---|---|
| $X_U/C$ (%) | $Y_U/C$ (%) | $X_L/C$ (%) | $Y_L/C$ (%) |
| 0.000 | 0.000 | 0.000 | 0.000 |
| 0.150 | 0.980 | 0.150 | −0.375 |
| 0.500 | 1.672 | 0.500 | −0.642 |
| 1.250 | 2.573 | 1.250 | −0.929 |
| 2.500 | 3.506 | 2.500 | −1.220 |
| 5.000 | 4.720 | 5.000 | −1.590 |
| 7.500 | 5.485 | 7.500 | −1.850 |
| 10.000 | 6.005 | 10.000 | −2.040 |
| 15.000 | 6.565 | 15.000 | −2.310 |
| 20.000 | 6.772 | 20.000 | −2.560 |
| 30.000 | 6.839 | 30.000 | −3.063 |
| 40.000 | 6.604 | 40.000 | −3.361 |

TABLE 2-continued

| Upper surface | | Lower surface | |
|---|---|---|---|
| $X_U/C$ (%) | $Y_U/C$ (%) | $X_L/C$ (%) | $Y_L/C$ (%) |
| 50.000 | 6.103 | 50.000 | −3.393 |
| 60.000 | 5.299 | 60.000 | −3.123 |
| 70.000 | 4.194 | 70.000 | −2.556 |
| 80.000 | 2.843 | 80.000 | −1.749 |
| 90.000 | 1.422 | 90.000 | −0.875 |
| 95.000 | 0.712 | 95.000 | −0.439 |
| 100.000 | 0.321 | 100.000 | 0.321 |

Figure 3:
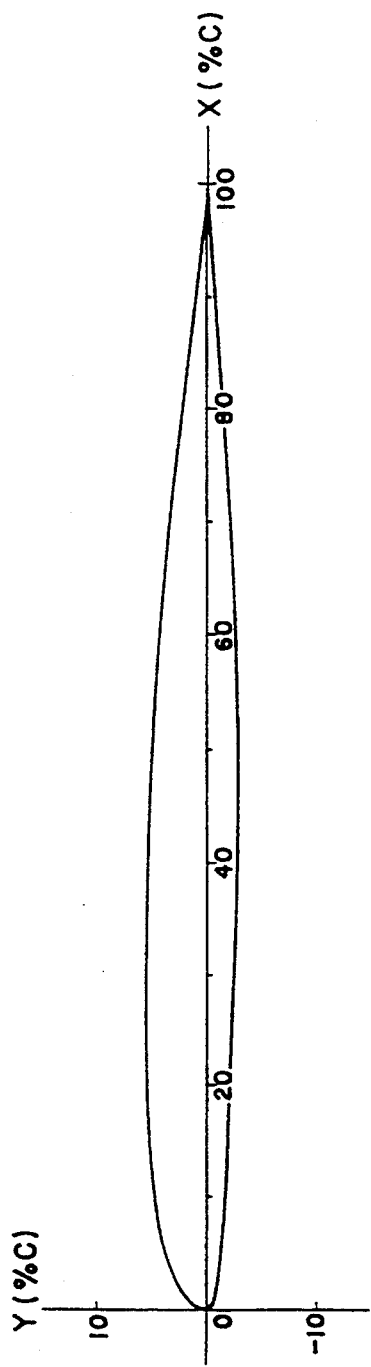
FIG. 3 is a graphical diagram showing an airfoil according to a third embodiment of the present invention.

FIG. 3 shows the cross-sectional shape of an airfoil section U896H-08 constituting a third embodiment of the present invention. The cross-sectional shape of the section U896H-08 is definitively specified by a modification of Table 1 for the airfoil section U896H-10. In this modification, each of the values of the ordinates $Y_U$ and $Y_L$ in Table 1 is multiplied by a coefficient 0.8.

Figure 4:
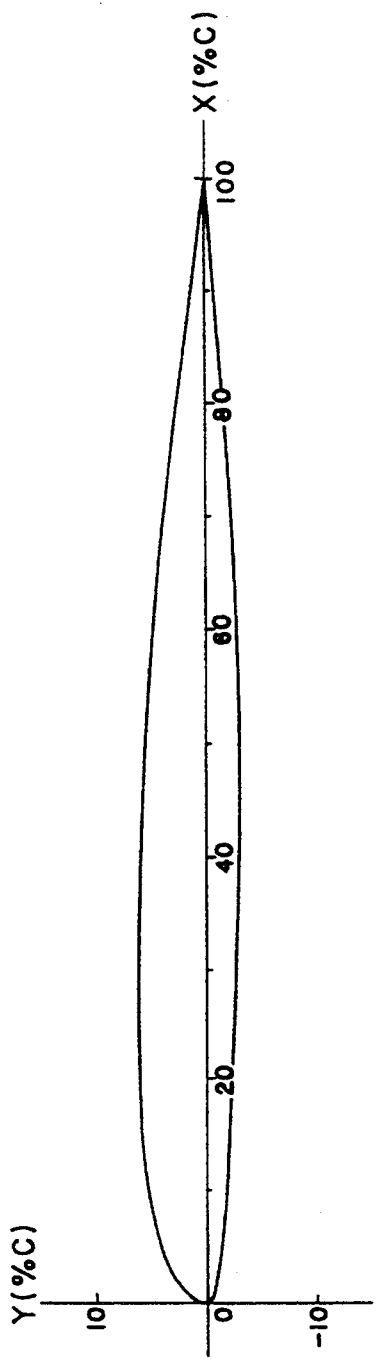
FIG. 4 is a graphical diagram showing an airfoil according to a fourth embodiment of the present invention.
Figure 5:
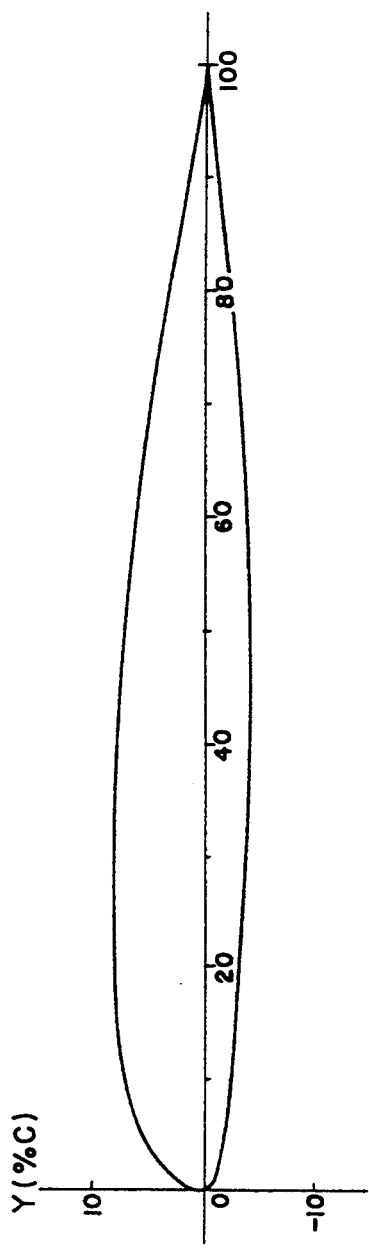
FIG. 5 is a graphical diagram showing an airfoil according to a fifth embodiment of the present invention.

FIGS. 4 and 5 show the cross-sectional shapes of airfoil sections U896H-09 and U896H-12, respectively, constituting fourth and fifth embodiments of the present invention. These cross-sectional shapes are definitively specified by respective modifications of Table 1 for the airfoil section U896H-10. In these respective modifications, each of the values of the ordinates $Y_U$ and $Y_L$ in Table 1 is multiplied by coefficients 0.9 and 1.2, respectively.

In each of the above described airfoil sections U896H-10, U896H-10UR, U896H-08, U896H-09, and U896H-12 of the present invention, the airfoil cross-section has a positive camber in its portion from its leading edge to its 30-percent chord length point. For this reason, the negative pressure peak at the upper surface of the leading edge of the airfoil is lessened, and the maximum lift coefficient is effectively increased. Furthermore, the airfoil in the vicinity of its leading edge has a positive camber. Therefore, lift is generated in the vicinity of the leading edge. On the other hand, in the region II from the 30-percent chord length point to the 90-percent chord length point, the airfoil has a shape wherein the upper and lower surfaces are essentially symmetrical. The lift generated by the airfoil in the region II is less than that generated by a positive-camber airfoil section. For this reason, the moment acting on the airfoil due to this lift is small. Therefore, it is possible to prevent an increase in (nose-down) negative pitching moment which has been unavoidable in a high-lift airfoil section.

Figure 6:
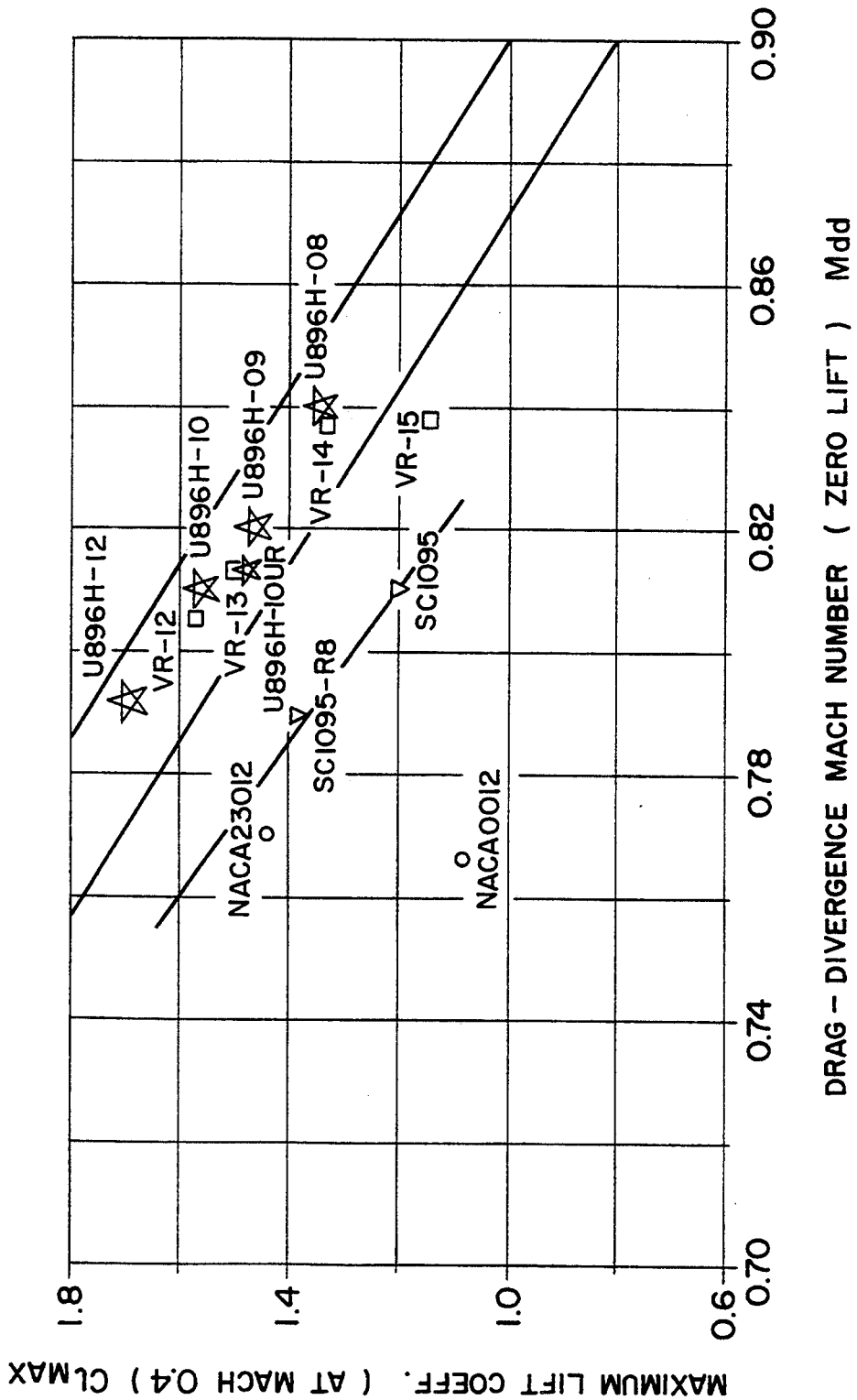
FIG. 6 is a graph for airfoil performance comparison indicating the performances of airfoils according to the present invention.

FIG. 6 is an airfoil performance comparison graph, in which the ordinate represents maximum lift coefficient ($Cl_{max}$) at Mach 0.4. The abscissa represents drag-divergence Mach number (Mdd) at zero lift. For the purpose of comparison two straight lines are shown in the graph. One of the straight lines joins a point (Mdd=0.80, $Cl_{max}$=1.5) and another point (Mdd=0.90, $Cl_{max}$=0.8). The other joins a point (Mdd=0.80, $Cl_{max}$=1.7) and another point (Mdd=0.90, $Cl_{max}$=1.0). The above described and designated five airfoil sections according to the present invention all exhibit performances lying between the two straight lines as indicated in FIG. 6.

For comparison, the performances of conventional airfoil sections such as NACA 23012, SC1095-R8, and VR-12 are also indicated in the same graph of FIG. 6. It is apparent from this comparison that the five airfoil sections of the present invention exhibit values of both maximum lift coefficient $Cl_{max}$ and drag-divergence Mach number Mdd that are equal or superior to those of the conventional airfoil sections.

Each of the airfoil sections U896H-10, U896H-08, U896H-09, and U896H-12 of the present invention can be provided in the vicinity of its trailing edge with a slightly up-turned part, for example, as in the section U896H-10UR. One example of such an up-turned part is approximately 0.3 percent of the chord length in the airfoil section U896H-10. The upturn of the trailing edge results in an airfoil with an essentially zero pitching moment. It is even possible to readily obtain an airfoil shape producing a nose-up (positive) pitching moment. Conversely, if a negative or nose-down pitching moment of a certain degree is allowable, an airfoil section having an even greater maximum lift coefficient can be obtained by lowering somewhat the part of the airfoil in the vicinity of its trailing edge.

As stated hereinbefore, the above described airfoil sections U896H-08, U896H-09, and U896H-12 are obtained by multiplying the ordinates Y of the upper and lower surfaces of the airfoil section U896H-10 by coefficients 0.8, 0.9, and 1.2, respectively. However, the multiplier coefficients are not restricted to the above three values. The multiplier coefficients may be any value from 0.5 to 1.5. Furthermore, the coordinates of the airfoil section U896H-10UR can also be used similarly to produce airfoils of similar performance.

From the foregoing disclosure, it will be apparent that the airfoil sections based on the section U896H-10 according to the present invention have a number of advantageous features. The most important of the features are as follows.

The airfoil section U896H-10 can exhibit a performance equal to or superior to those of the high-performance airfoil section series from VR-12 to VR-15 mentioned hereinbefore in the description of the prior art. This high performance is achieved while the pitching moment is held at a low value without an up-curved or reflexed trailing edge or the provision of an up-turned trailing-edge tab.

Another feature is that the airfoil section U896H-10 has a shape in the vicinity of its trailing edge wherein the upper and lower surfaces are symmetrical. For this reason, the pitching moment can be made essentially zero by adding a very small upward curve or reflex to the trailing edge part of the airfoil . By using a somewhat greater reflex, an airfoil section with a positive (nose-up or stalling) pitching moment can be readily obtained. On the other hand, if a negative (nose-down) pitching moment is allowable, an increase in the maximum lift coefficient can be obtained by providing the airfoil trailing edge part with a moderate down curve.

Thus, it is apparent that the airfoil section of the present invention can be adapted to meet a wide range of performance requirements by merely imparting slight variations to the basic airfoil section. More specifically, the trailing edge portion of the airfoil section can be curved upward or downward, and the section thickness can be adjusted by multiplying the section ordinates by suitable multiplier coefficients. By selecting appropriate combinations of these variables for each station in the radial direction from the root to the tip of each rotary-wing blade of a rotary-wing aircraft, a rotary wing of optimum performance and characteristics can be obtained.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rotary-wing blade for a rotary-wing aircraft, said blade having a leading edge and a trailing edge, and cross sections constituting airfoil sections, each of which has a chord line, chord length, and upper and lower blade surface curves, said rotary-wing blade being based in shape on a basic airfoil section comprising:

an asymmetrical region of positive camber from the leading edge aft to a point at approximately 30 percent of the chord length from the leading edge;

another region essentially of symmetry of the upper and lower surface curves from said 30-percent chord length point to a point approximately 90 percent of the chord length from the leading edge; and said basic airfoil section from the leading edge to the 90-percent chord length point being defined by the X-coordinates in Table 1 in the specification which represent the distance aft from the leading edge expressed as a percentage of the chord length, and by the Y coordinates set forth in the table 1 in the specification times a multipier coefficient of 0.5 to 1.5 wherein: Y is the coordinate distance of the surface curves from and perpendicular to the chord line, being positive and negative, respectively, above and below the chord line; all distances are expressed as percentages of the chord length C; and subscripts U and L denote upper and lower surface curves, respectively, and said airfoil being dimensioned and arranged such that a plotted point for Mdd (zero lift) and Cl max (at 0.4 Mach) values of the airfoil fall above a line extending between points of about (0.80, 1.5) and (0.90, 0.80) on a Mdd (zero lift) abscissa and Cl max (at 0.4 Mach) ordinate graph.

2. The rotary-wing blade according to claim 1, wherein the region of the airfoil aft of the approximately 90-percent chord point to the trailing edge is curved upward from the chord line to increase the pitching moment positively.

3. The rotary-wing blade according to claim 1, wherein the region of the airfoil aft of the approximately 90-percent chord point to the trailing edge is curved downward from the chord line to decrease the pitching moment positively.

4. The rotary-wing blade according to claim 1 wherein the multiplier coefficient is 1.0.

5. The rotary-wing blade according to claim 1 wherein the multiplier coefficient is 0.8.

6. The rotary-wing blade according to claim 1 wherein the multiplier coefficient is 1.2.

7. The rotary-wing blade according to claim 1 wherein the multiplier coefficient is 0.9.

8. The rotary-wing blade according to claim 1 wherein the multiplier coefficient is 1 and said air foil has an upturn of about 0.3 percent with respect to the chord length from a 95-percent chord dimension point aft.

9. The rotary wing blade according to claim 1 wherein said airfoil is free of an up-curved or reflexive trailing edge.

* * * * *